United States Patent
Bates et al.

(10) Patent No.: US 6,854,073 B2
(45) Date of Patent: Feb. 8, 2005

(54) DEBUGGER PROGRAM TIME MONITOR

(75) Inventors: Cary Lee Bates, Rochester, MN (US); Scott N. Gerard, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 09/962,866

(22) Filed: Sep. 25, 2001

(65) Prior Publication Data

US 2003/0061542 A1 Mar. 27, 2003

(51) Int. Cl.$^7$ .................................................. G06F 11/00
(52) U.S. Cl. .............................. 714/38; 714/34; 714/35; 714/47; 717/124
(58) Field of Search ............................. 714/38, 34, 35, 714/45, 46, 47; 717/124, 125, 126, 127, 128, 129, 131

(56) References Cited

U.S. PATENT DOCUMENTS

| | | | | |
|---|---|---|---|---|
| 5,140,671 A | * | 8/1992 | Hayes et al. ................... 706/60 |
| 5,167,012 A | * | 11/1992 | Hayes et al. ................... 706/60 |
| 5,754,839 A | * | 5/1998 | Pardo et al. ................. 712/227 |
| 6,038,686 A | * | 3/2000 | Rana ............................ 714/29 |
| 6,041,177 A | * | 3/2000 | Kawabe et al. ............. 717/125 |
| 6,266,788 B1 | * | 7/2001 | Othmer et al. ................ 714/38 |
| 6,295,613 B1 | * | 9/2001 | Bates et al. .................... 714/43 |

* cited by examiner

*Primary Examiner*—Scott Baderman
(74) *Attorney, Agent, or Firm*—Moser Patterson & Sheridan LLP

(57) ABSTRACT

Apparatus, methods and articles of manufacture for collecting performance data in a debugger environment. In one embodiment, performance data is collected and associated with a breakpoint. The performance data may then be displayed to a user in a meaningful way. In one embodiment, a user is provided with performance data for the last execution path resulting in terminating at a breakpoint, regardless of an origination point of the execution path. In another embodiment, a user is provided with the collective performance data for any execution path terminating at a breakpoint. In still another embodiment, a user is provided with a historical account for a particular execution path using cumulative data for that path. Still another embodiment provides a debugger configured to track performance data based on variable values.

28 Claims, 8 Drawing Sheets

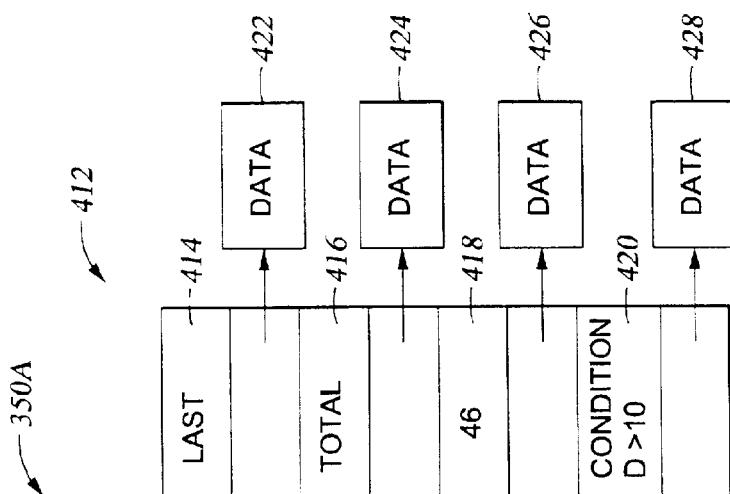
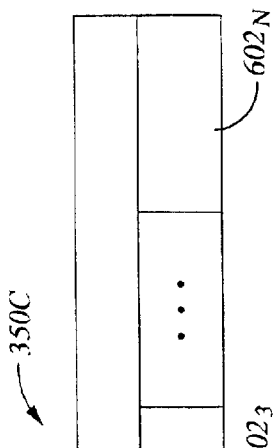
*Fig. 4*
*Fig. 5*
*Fig. 6*

DEBUGGER PROGRAM TIME MONITOR

BACKGROUND OF THE INVENTION

1. Field of the Invention

The present invention generally relates to data processing. More particularly, embodiments are provided for organizing performance data collected for a program being debugged.

2. Description of the Related Art

Inherent in any software development technique is the potential for introducing "bugs". A bug will typically cause unexpected results during the execution of the program. Locating, analyzing, and correcting bugs in a computer program is a process known as "debugging." Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"). The debugger may be located on and executed by the same computer system on which the program is executed or may be located on a different system from the one the program is executed on, in the case of a distributed debugger.

Conventional debuggers typically support various operations to assist a computer programmer. Each operation allows the programmer to examine the state of program registers and variables at a given point in the execution of a program. Typical operations supported by conventional debuggers include breakpoint operations, "step" functions, and "run to" operations.

A "breakpoint" is a point in the program where execution of the computer program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

The use of breakpoints is particularly useful in today's multithreaded environments. Threads present timing problems that can be very difficult to track down. Accordingly, today's debuggers allow users to set breakpoints, and once the breakpoint is hit the users can examine the position of each thread in an application to determine whether the thread is behaving as expected. However, such use of breakpoints only provides a snapshot of the current state of the program, and does not provide information as to why the current state has occurred.

Therefore, a need exists for a debugger which provides historical information about the execution of threads.

SUMMARY OF THE INVENTION

Apparatus, methods and articles of manufacture are provided for collecting performance data in a debugger environment. In one embodiment, a method of categorizing performance data in a debugging environment, comprises: executing a computer program during a debugging session; collecting performance data during the debugging session; and categorizing the performance data with debugger information. In another embodiment, the forgoing method is implemented as a program on a computer readable medium.

Illustratively, at least three modes of categorizing the performance data with debugger information are provided. A first mode comprises associating the performance data with breakpoint information for at least one execution path having an execution path origination point and a program termination point at a breakpoint. A second mode comprises, at a predefined location in the computer program, determining whether a user-specified condition is satisfied; and if so, associating the performance data collected between a program origination point and the program termination point with breakpoint information, wherein the computer program origination point is a stopped point at which the computer program was last stopped prior to the program termination point. A third mode comprises: detecting when a variable changes in value; incrementing an index number upon detecting that the variable has changed in value; and storing the index value, a current value of the variable and a name of the variable to an entry of a list; and while collecting the performance data, associating the index value with the performance data collected while a variable has the current value.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a breakpoint table.

FIG. 5 is a performance class list.

FIG. 6 is a monitor event list.

DETAILED DESCRIPTION OF THE PREFERRED EMBODIMENTS

Figure 1:
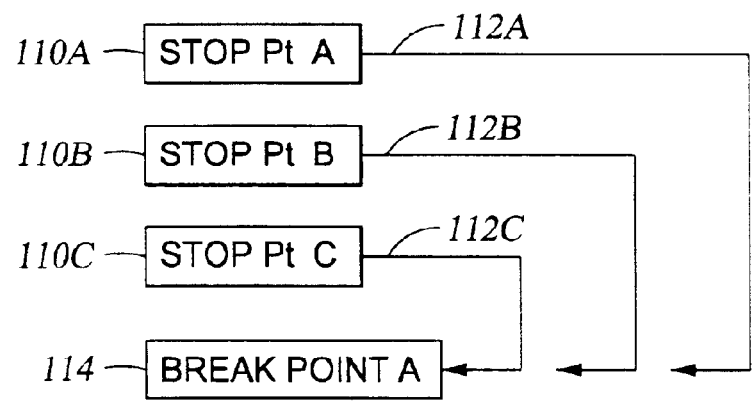
FIG. 1 illustrates execution paths from a plurality of stopped points to a breakpoint.

Apparatus, methods and articles of manufacture are provided for collecting performance data in a debugger environment. Performance data includes any data associated with the execution of a program, as in known in the art. For example, performance data includes histograms showing functions, sub-functions and lines of code. In general, the performance data is categorized with debugger information in at least one of various modes. Some embodiments may be understood with brief reference to FIG. 1. FIG. 1 shows a plurality of stop points 110A–C (three shown) at which a program was halted. For example, the program may have hit a breakpoint at the stop points 110A–C. From each stop point 110A–C, the program resumed execution and proceeded along execution paths 112A–C, respectively. In each case, execution was again halted upon reaching a breakpoint 114. Each of the execution paths 112A–C have associated performance data. This performance data is collected and associated with the breakpoint 114. The performance data may then be displayed to a user in a meaningful way. Illustrative output which may be provided to a user is shown in Table I.

TABLE I

| 001 | BREAKPOINT A |
| --- | --- |
| 002 | Last |
| 003 | Total |
| 004 | Stop Point A |
| 005 | Stop Point B |
| 006 | X > 5 |

Specifically, Table I shows performance data associated with (subsetted for) the breakpoint 114 (shown in FIG. 1) when the breakpoint 114 is encountered from stop point 110C proceeding via possible execution paths, represented by execution path 112C. The breakpoint for which performance data is provided is indicated on line 001. In one embodiment, a user is provided with performance data (represented as "last" on line 002) for the last execution path resulting in terminating at a breakpoint, regardless of an origination point of the execution path. The "last execution path" is the execution path which has just been executed to reach the current stop point. In the present example, the performance data is that data associated with execution path 112C. In another embodiment, a user is provided with the collective performance data for any execution path terminating at a breakpoint, represented as "Total" on line 003. In still another embodiment, a user is provided with a historical account for a particular execution path using cumulative data for that path. For instance, in the present example execution paths 112A–B have been previously executed, thereby resulting in performance data being associated with the breakpoint 114 for each of the respective stop points 110A and 110B. The performance data has been cumulatively collected for each execution of the execution paths 112A–B. This performance data is represented on lines 004–005.

In another embodiment, a performance class or classes may be registered. In general, a performance class is a user-defined condition. The performance class is specified at some location within the program, which may be a location of a breakpoint. In the example provided in Table I a performance class associated with the breakpoint 114 is indicated on line 006. Thus, when the breakpoint 114 is hit, all threads of the program would be held, and the expression X>5 would be evaluated. If the expression is true, the performance data is associated with the performance class.

In addition to specifying the performance class on the breakpoint, performance classes could also be specified at any point such that they would carry forward to the next breakpoint. When such a "stand-alone" performance class (also referred to herein as "performance class point") is encountered, all program threads and performance monitoring are halted and the expression is evaluated. If the expression is false, the program and the performance monitoring are allowed to resume. If the expression is true, the performance class is associated with a performance class list. When a breakpoint is subsequently hit, a category for each performance class in the performance class list is created and associated with a collected performance data.

Figure 2:
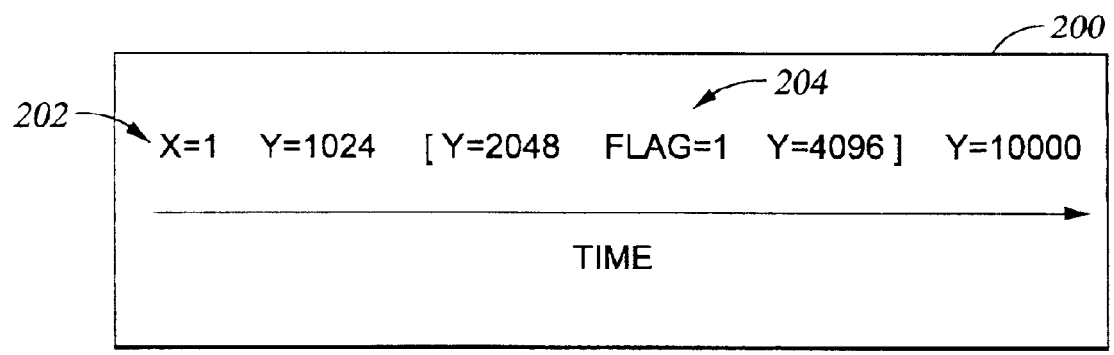
FIG. 2 is a user interface illustrating a user-selected variable value range.

In addition to categorizing data based on breakpoints and variables, one embodiment provides a debugger configured to track performance data based on variable value. Such an implementation allows a user to see the effect that various program constants or values have on program performance. An illustrative interface 300 for such a feature is shown in FIG. 2. The interface 200 shows a linear list 202 of the changes made within a debugger ordered chronologically from left to right beginning with the oldest. From the list 202 a user is able to select ranges to include in the reporting of performance results. Data collected before or after a selected point or range is not included in the report. Illustratively, a user has selected a range 204 beginning when Y was changed to 2048 and ending when Y was changed to 4096. Upon submitting this query, the appropriate performance data for the selected range will be displayed to the user.

Various embodiments utilize breakpoints and watchpoints to advantage. As described above, a breakpoint is a point in a computer program where execution of the program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

The breakpoint may be unconditional or conditional. Unconditional means that once such a breakpoint is reached, execution of the program is always halted. Conditional breakpoints only halt execution of a program when a variable used by the program is set to a predetermined value at the time such a breakpoint is reached.

Watchpoints are also known as data access breakpoints and address compare breakpoints. As used herein, a watchpoint is a hardware directed event such that when a variable value is modified the watch will fire. Such a watchpoint does not require a modification of object code. In another embodiment, the watchpoint may be implemented in software.

One embodiment of the invention is implemented as a program product for use with a computer system such as, for example, the computer system 310 shown in FIG. 3 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiments may also be practiced in distributed computing environments where tasks are performed by remote processing devices that are linked through a communications network. In a distributed computing environment, program modules may be located in both local and remote memory storage devices.

Figure 3:
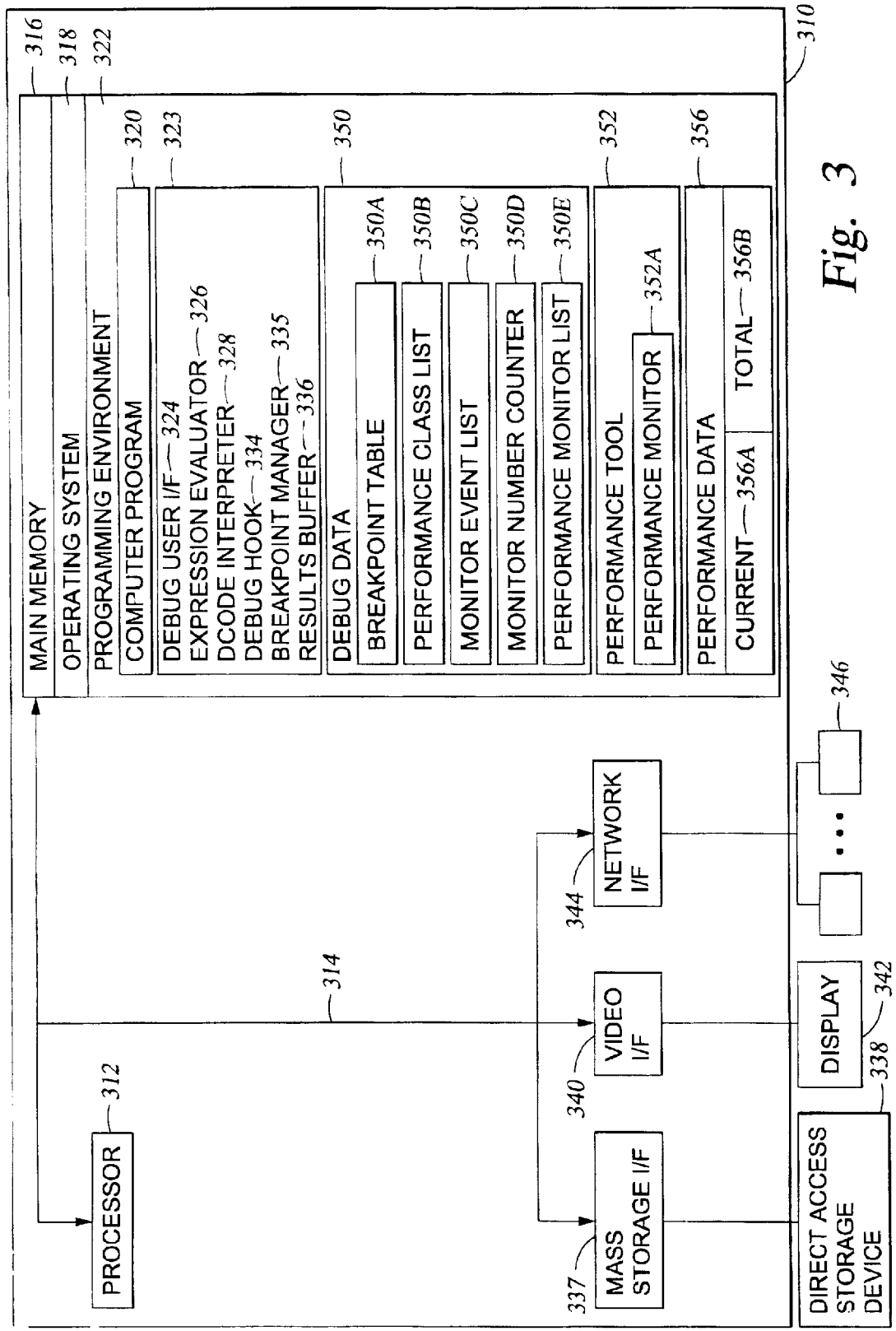
FIG. 3 is a high-level diagram of a computer system.

Referring now to FIG. 3, a computer system 310 consistent with the invention is shown. Computer system 310 may represent any type of computer, computer system or other programmable electronic device, including a client computer, a server computer, a portable computer, an embedded controller, etc. The computer system 310 may be a standalone device or networked into a larger system. In one embodiment, the computer system 310 is an eServer iSeries 400 computer available from International Business Machines of Armonk, N.Y.

The computer system 310 could include a number of operators and peripheral systems as shown, for example, by a mass storage interface 337 operably connected to a direct access storage device 338, by a video interface 340 operably connected to a display 342, and by a network interface 344 operably connected to a plurality of networked devices 346. The display 342 may be any video output device for outputting a user interface. The networked devices 346 could be desktop or PC-based computers, workstations, network terminals, or other networked computer systems.

Computer system 310 is shown comprising at least one processor 312, which obtains instructions, or operation codes, (also known as opcodes), and data via a bus 314 from a main memory 316. The processor 312 could be any processor adapted to support the debugging methods, apparatus and article of manufacture of the invention. In particular, the computer processor 312 is selected to support monitoring of memory accesses according to user-issued commands. Illustratively, the processor is a PowerPC available from International Business Machines of Armonk, N.Y.

The main memory 316 could be one or a combination of memory devices, including Random Access Memory, non-volatile or backup memory, (e.g., programmable or Flash memories, read-only memories, etc.). In addition, memory 316 may be considered to include memory physically located elsewhere in a computer system 310, for example, any storage capacity used as virtual memory or stored on a mass storage device or on another computer coupled to the computer system 310 via bus 314.

The main memory 316 generally includes an operating system 318 and a programming environment 322. The programming environment 322 comprises a computer program 320 (to be debugged), a debugger program 323, debug data 350, a performance tool 352 and performance data 356. The performance tool 352 shown configured with a performance monitor 352A. However, in another embodiment, the performance monitor 352A may be a separate software component. In still another embodiment, the performance monitor 352A use a hardware component. Regardless of the particular implementation, the performance tool 352 is configured to generate performance data 356. Illustratively, the performance data 356 includes current data 356A and total data 356B. In one embodiment, the debug data 350 may include a breakpoint table 350A, a performance class list 350B, monitor event list 350C, a monitor number counter 350D and a performance monitor list 350E.

The programming environment 322 facilitates debugging the computer program 320, or computer code, by providing tools for locating, analyzing and correcting faults. One such tool is the debugger program 323 (also referred to herein as the debugger). In one embodiment, the debugger 323 is a VisualAge for C++ for OS/400 debugger modified according to the invention. VisualAge for C++ for OS/400 is available from International Business Machines of Armonk, N.Y. The functionality of the debugger program 332 is enhanced by the incorporation of the performance data made available by the performance tool 352. One performance tool which may be adapted to carry out the methods described herein is the VisualAge for C++ Performance Analyzer available from International Business Machines, Inc.

Although the software constructs, such as the computer program 320 and the debugger 323, are shown residing on the same computer, a distributed environment is also contemplated. Thus, for example, the debugger 323, the debug data 350 and the monitored variables program 352 may be located on a networked device 346, while the computer program 320 to be debugged is on the computer system 310.

In a specific embodiment, the debugger 323 comprises a debugger user interface 324, expression evaluator 326, Dcode interpreter 328 (also referred to herein as the debug interpreter 328), debugger hook 334, a breakpoint manager 335 and a results buffer 336. Although treated herein as integral parts of the debugger 323, one or more of the foregoing components may exist separately in the computer system 310. Further, the debugger may include additional components not shown. Also, while the monitored variables program 352 is shown separately from the debugger 323, the program 352 may, in fact, be a component of the debugger 323.

A debugging process is initiated by the debug user interface 324. The user interface 324 presents the program under debugging and highlights the current line of the program on which a stop or error occurs. The user interface 324 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 326 parses the debugger command passed from the user interface 324 and uses a data structure (e.g., a table) generated by a compiler to map the line number in the debugger command to the physical memory address in memory 316. In addition, the expression evaluator 326 generates a Dcode program for the command. The Dcode program is machine executable language that emulates the commands. Some embodiments of the invention include Dcodes which, when executed, activate control features described in more detail below.

The Dcode generated by the expression evaluator 326 is executed by the Dcode interpreter 328. The interpreter 328 handles expressions and Dcode instructions to perform various debugging steps. Results from Dcode interpreter 328 are returned to the user interface 324 through the expression evaluator 326. In addition, the Dcode interpreter 328 passes on information to the debug hook 334, which takes steps described below.

After the commands are entered, the user provides an input that resumes execution of the program 320. During execution, control is returned to the debugger 323 via the debug hook 334. The debug hook 334 is a code segment that returns control to the appropriate user interface. In some implementations, execution of the program eventually results in an event causing a trap to fire (e.g., a breakpoint or watchpoint is encountered). Control is then returned to the debugger by the debug hook 334 and program execution is halted. The debug hook 334 then invokes the debug user interface 324 and may pass the results to the user interface 324. Alternatively, the results may be passed to the results buffer 336 to cache data for the user interface 324. In other embodiments, the user may input a command while the program is stopped, causing the debugger to run a desired debugging routine. Result values are then provided to the user via the user interface 324.

FIG. 4 shows one embodiment of the breakpoint table 350A. In general, the breakpoint table 350 provides some aspects which are well-known in the art in combination with some inventive features. For example, as is well-known, a location column 402 and an opcode (operation code) column 404 are shown. The information contained under the location column 402 specifies a memory location of a breakpoint. The information contained under the opcode column 404 specifies the original operation code of the program which has been replaced with some "bad" operation code. The breakpoint table 350A is further configured with a performance class 406, and performance class point 408 and a performance data list 410. An illustrative performance data list entry 412 comprises a last entry 414, a total entry 416, an execution path history entry 418 (although only one is shown, a plurality of execution path history entries may be provided) and a performance class entry 420. Each entry 414–420 of the performance data list entry 412 is associated with performance data 422–428, respectively.

FIG. 5 shows one embodiment of the performance class list 350B. In general, the performance class list 350B includes a plurality of entries $502_{1-N}$. Each entry $502_{1-N}$ contains a user specified performance class. For example, a first pair of entries $502_{1-2}$ contain the performance class conditions A<5 and D>10, respectively. The performance class as may be specified on a breakpoint or any other location in the computer program 320 (referred to herein as "stand-alone" performance classes), as described above.

Referring briefly again to FIG. 3, the monitor number counter 350D is configured to generate a monitor number useful in tracking changes made to program variables. In operation, the monitor number generated by the monitor number counter 350D is used to tag the performance data collected to allow subsequent identification and retrieval of desired performance data. The monitor number counter 350D is incremented each time a variable is changed so that each monitor number is associated with some value of a variable. Thus, each monitor number is associated with some performance data collected while some variable has a given value. Each monitor number is stored to an entry of the monitor event list 350C. One embodiment of the monitor event list 350C is shown in FIG. 6. In general, the monitor event list 350C is an ordered list comprising a plurality of entries $602_{1-N}$. One entry is provided for each successive monitor number. In addition to containing a monitor number, each entry $602_N$ contains a variable name and variable value. A user interested in a particular value or range of values may specify the variable name(s) and value(s) to the debugger 323. The associated monitor number(s) may then be used to index into the performance data 356.

Figure 7:
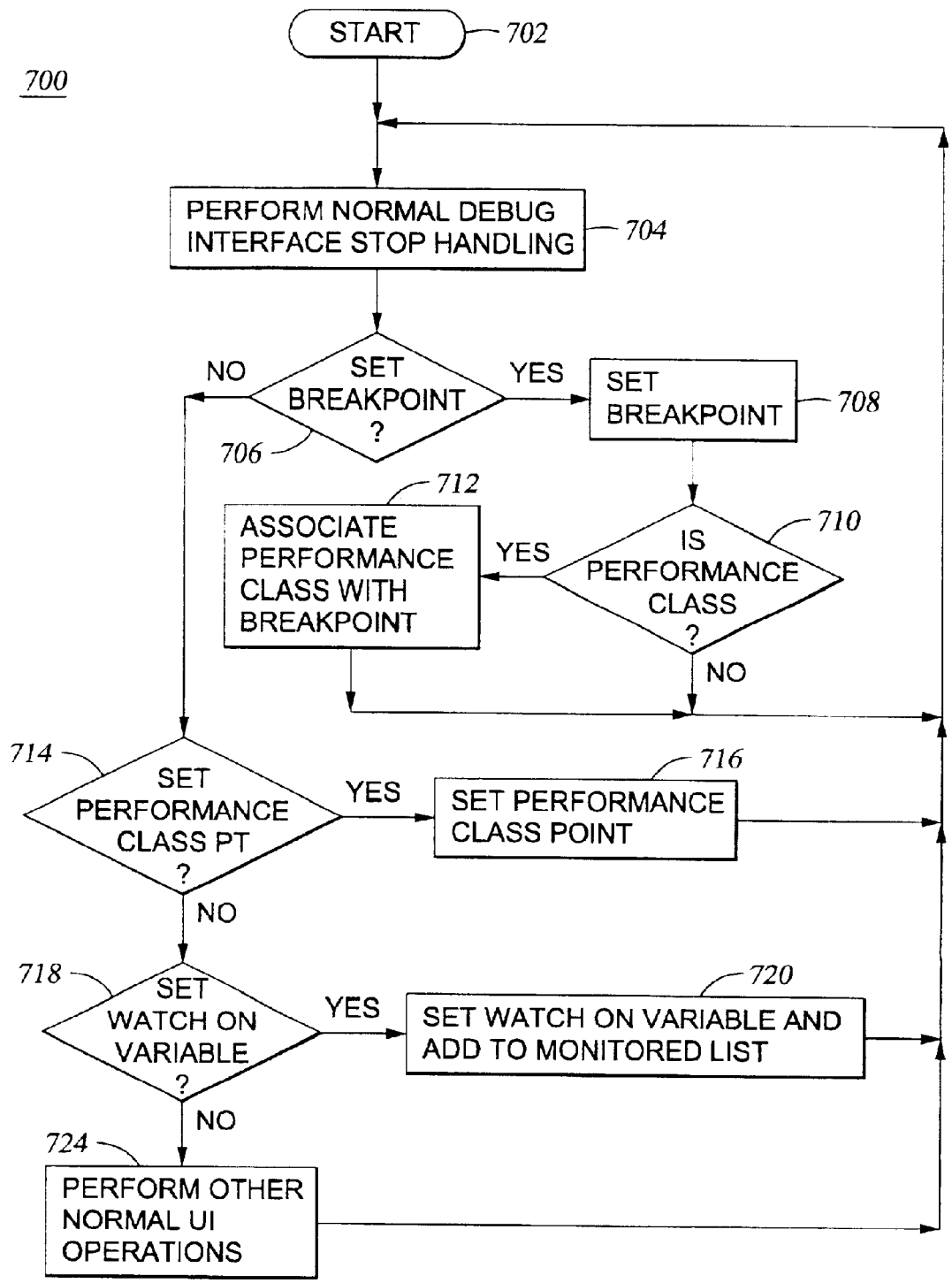
FIG. 7 is a flow chart illustrating the operation of a user interface.

FIG. 7 shows a method 700 illustrating the operation of the user interface 324. The method 700 is entered at step 702 when a user provides some input. At step 704 normal debug interface stop handling is performed. At step 706, the method 700 queries whether the user is setting a breakpoint. If so, the breakpoint is set at step 708 by storing the appropriate information to the breakpoint table 350A. For example, entries of the location column 402 and the opcode column 404 are populated. At step 710, the method 700 queries whether the user has specified a performance class with the breakpoint. In one embodiment, a performance class is input as part of a command line specifying the breakpoint. In another embodiment, the performance class may be specified by selecting the class from a menu. In any case, if a performance class is specified at step 710, the performance class is associated with the breakpoint at step 712. That is, performance class information is stored under the performance class column 406 in the breakpoint table record containing the breakpoint information stored at step 708. If step 710 is answered negatively, the method 700 returns to step 704.

If step 706 is answered negatively, the method 700 proceeds to step 714 and queries whether the user is setting a performance class point. In one embodiment, a performance class point is set by inputting a performance class point command line. For example, the command line "PERF_PT 106" sets a performance class point on line 106 of the computer program 320. In general, a performance class point is a breakpoint which does result in the user interface 324 being called upon being encountered. Instead, when encountered, the performance class point gives control to the debugger 323 determine whether a condition is true or false. Subsequently, the program is allowed to resume execution. In one embodiment, the condition being tested is a performance class expression contained in an associated breakpoint table record entry under the performance class column 406. In another embodiment, a user may simply be interested in whether the computer program 320 encounters the performance class point at all, in which case no performance class (under the performance class column 406) need be set. In any case, if step 714 is answered affirmatively, the performance class point is set at step 716 by setting the flag under the performance class point column 408 in the appropriate record to TRUE. In addition, a performance class expression may be stored to the associated entry of the performance class column 406, as described above. The method 700 and returns to step 704.

If step 714 is answered negatively, the method 700 proceeds to step 718 where a determination is made as to whether the user is setting a watch on a variable. If so, at step 720, a watch is set on a specified variable and the variable is added to the performance monitor list 350E. Processing than returns to step 704.

If steps 706, 714 and 718 are each answered negatively, the method 700 proceeds to step 724 where other normal user interface operations are performed. Processing then returns to step 704.

Figure 8:
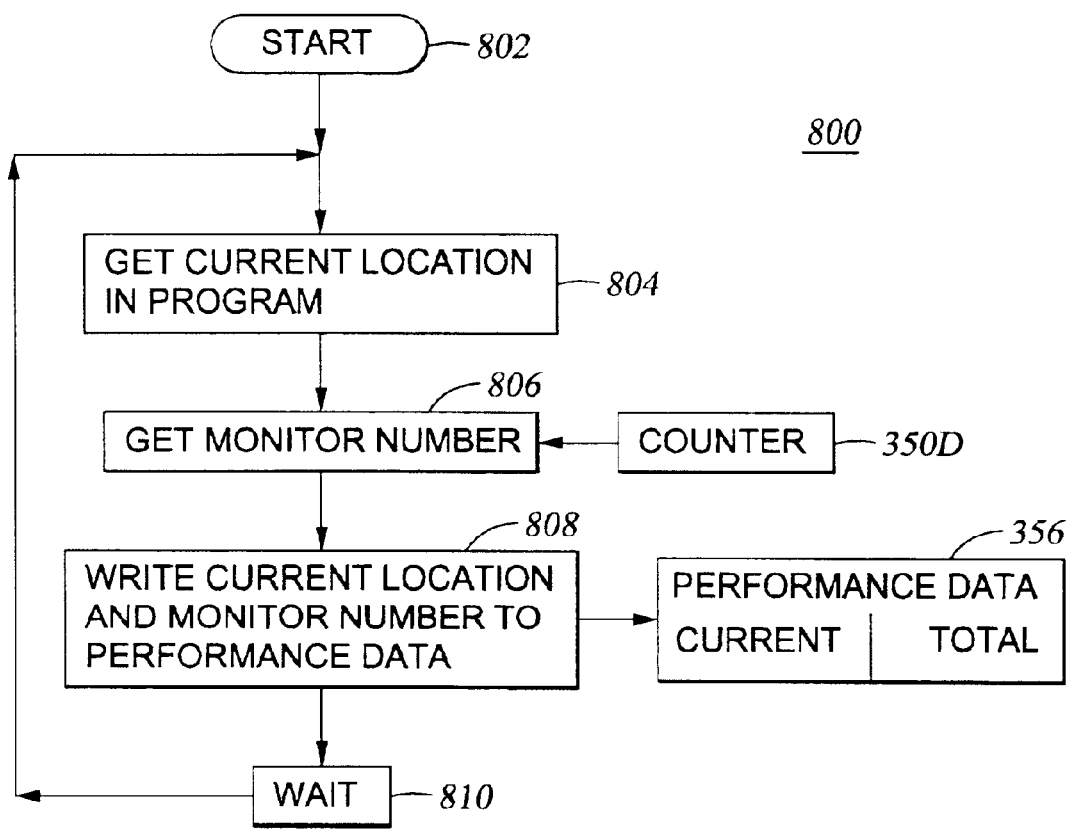
FIG. 8 is a flow chart illustrating the operation of a performance monitor.

During execution of the computer program 320, the performance monitor 352A operates to track monitor numbers. One embodiment illustrating the operation of the performance monitor 352A is shown as method 800 in FIG. 8. The method 800 is entered at step 802 and then proceeds to step 804 to get the current location in the computer program 320. At step 806, the performance monitor 352A retrieves a monitor number from the monitor number counter 350D. At step 808 the current location and the monitor number are written to the performance data 356. At step 810, the performance monitor 352A waits for some predetermined period of time before again returning to step 804 to repeat the method 800.

Figure 9A:
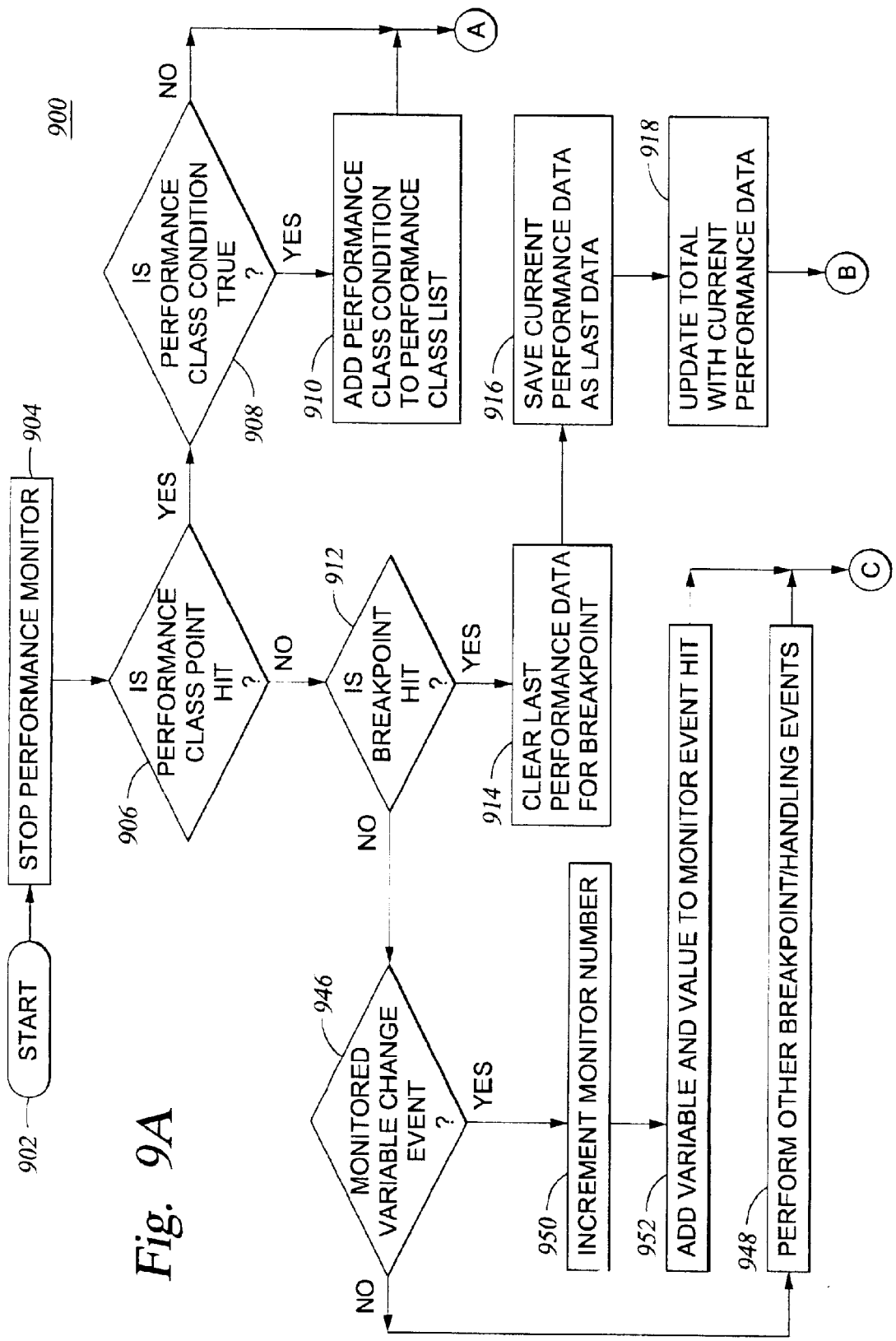
FIG. 9 is a flow chart illustrating the operation of a debug hook.
Figure 9B:
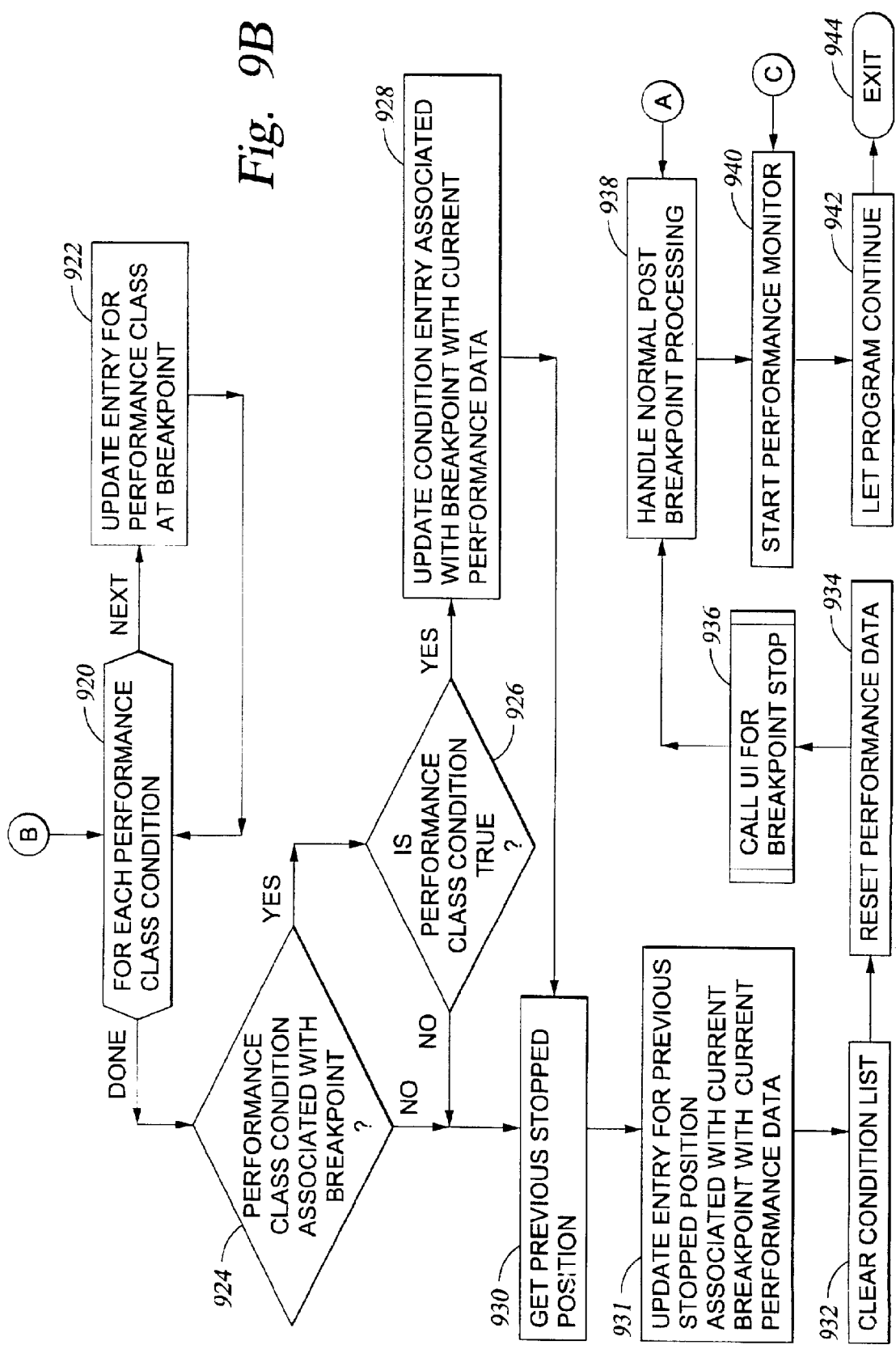

FIG. 9 shows a method 900 illustrating the operation of the debug hook 334. The method 900 is entered at step 902 upon the occurrence of a debug event, such as encountering a breakpoint or a watch point firing. At step 904 the performance monitor 352A is stopped. At step 906, the method 900 queries whether a performance class point has been hit. That is, a determination is made as to whether a flag of the performance class point column 408 (of the breakpoint table 350A) corresponding to the present location in the computer program 320 (specified by an entry under the location column 402) is TRUE. If so, processing continues to step 908 and queries whether the performance class condition (specified in the performance class condition entry 420 of the performance data list 410) is true. If so, the performance class condition is added to the performance class list 350B, if the condition has not already been previously added. As noted above, a performance class point may be set without an associated performance class condition. In such an embodiment, step 908 is unnecessary and the performance class point is recorded in the performance class list 350B at step 910. Normal post performance class point/breakpoint processing is then handled at step 938 and the performance monitor 352A is restarted at step 940. The computer program 320 then resumes processing at step 942 and the method 900 exits at step 944.

If the query at step 906 is answered negatively, processing proceeds to step 912 where the method 900 queries whether a breakpoint has been hit. This determination is made with reference to the breakpoint table 350A where a breakpoint is specified by a record corresponding to the current computer program location and having the flag under the performance class point column 408 set to FALSE. If such a record exists, processing proceeds to step 914 where the last performance data 422 of the performance data list 410 (in the breakpoint table 350A) for the breakpoint is cleared. The current performance data 356A is then saved as the last performance data 422 in the performance data list 410, at step 916. The current performance data 356A is the performance data collected during the program execution which was initiated from the last stopped point and which has just been halted as a result of hitting the breakpoint. At step 918, the total data 424 of the performance data list 410 for the breakpoint is updated with the current performance data 356A.

At step 920, the method 900 enters a loop for each performance class in the performance class list 350B. At step 922, each performance class condition entry 420, which is represented in the performance class list 350B, is updated with the current performance data 356A. Once each performance class in the performance class list 350B has been processed, the method 900 proceeds to step 924.

At step 924, the method 900 queries whether a performance class condition is associated with a breakpoint by referencing the appropriate entry (i.e., the entry associated with the current breakpoint) under the performance class column 406 of the breakpoint table 350A. If step 924 is answered affirmatively, the method 900 queries, at step 926, whether the performance class condition is true. If so, the performance class condition 420 associated with the current breakpoint is updated with the current performance data 356A, as indicated by step 928. Processing then proceeds to step 930. Processing also proceeds to step 930 from step 924 if step 924 is answered negatively.

At step 930, the previous stopped position is retrieved. Typically, the previous stopped position corresponds to a breakpoint location. However, in some cases a user may have stepped in to, or over, some number of program lines. In any case, at step 931, the execution path history entry 418 associated with the current breakpoint is updated with the current performance data 356A.

The performance class list 350B is cleared at step 932 and the performance data 356 is reset at step 934. That is, the total performance data 356B is updated with the current performance data 356A, after which the current performance data 356A is cleared. The user interface 324 is called at step 936 to indicate the breakpoint stop. One embodiment illustrating the operations at step 936 is described below with reference to all FIG. 10. Normal post breakpoint processing is handled at step 938 and the performance monitor 352A is resumed at step 940. The program 320 is then allowed to resume at step 942 and the method 900 exits at step 944.

If the query at step 906 is answered negatively, processing proceeds to step 946 where the method 900 queries whether a monitored variable has changed, i.e., whether a watch has fired for a variable in the performance monitor list. If not, normal processing is handled at step 948. The method 900 then proceeds to step 940, which has been described above. If step 946 is answered negatively, the monitor number counter 350D is incremented at step 950.

Figure 10:
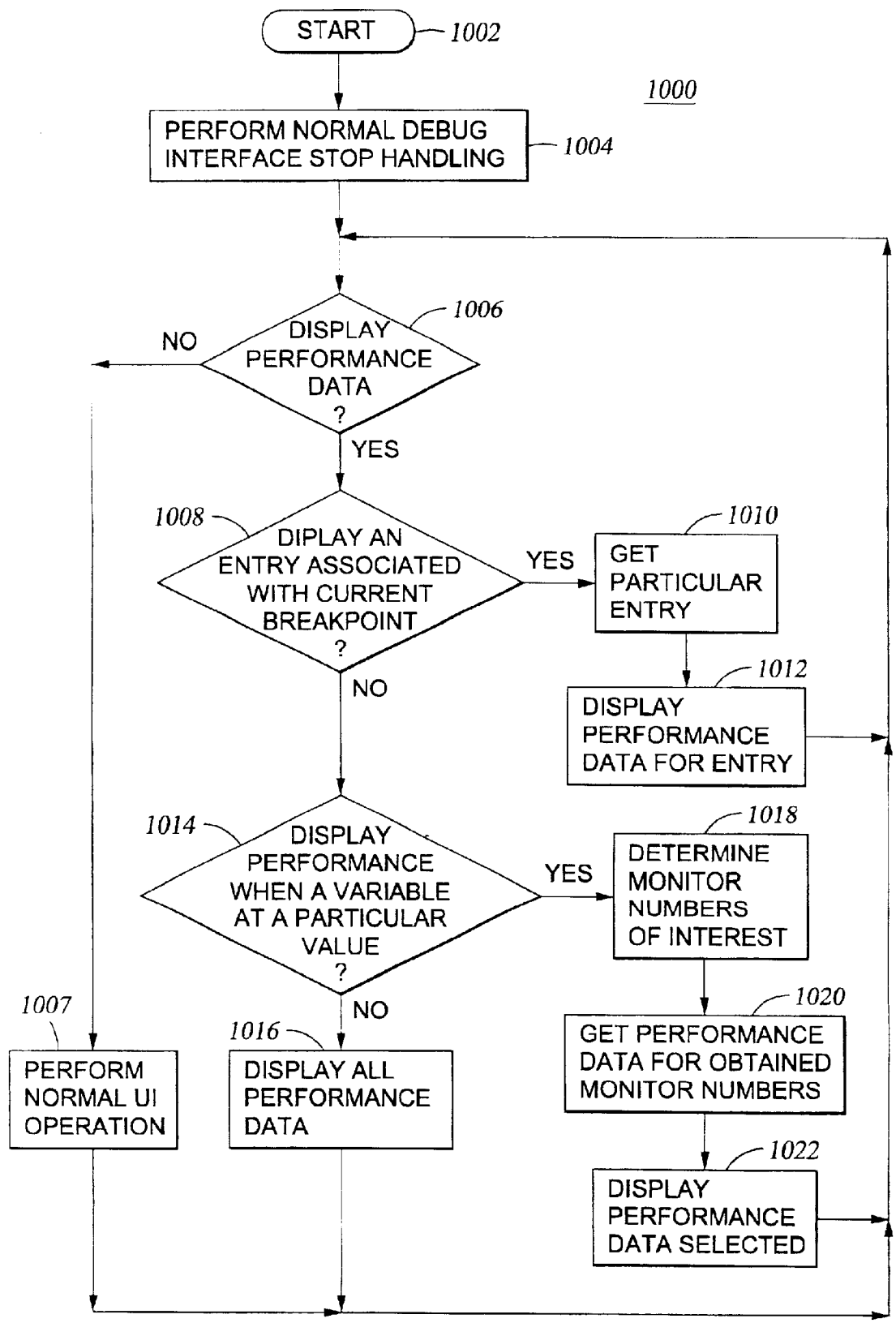
FIG. 10 is a flow chart illustrating the operation of a user interface.

FIG. 10 shows a method 1000 illustrating the execution of the user interface 324 called at step 936 of FIG. 9. The method 1000 is entered at step 1002 and proceeds to step 1004 to perform normal debug interface stop handling. At step 1006, the method 1000 queries whether the user has requested to display performance data. If not, processing proceeds to step 1007 where other normal user interface operations are performed. If the query at step 1006 is answered affirmatively, processing proceeds to step 1008 where the method 1000 queries whether the user has requested to display an entry (e.g., the last entry 414, the total entry 416, execution path history entry 418 or the performance class entry 420) associated with a breakpoint. If so, the appropriate entry is retrieved at step 1010 and the performance data for the entry is displayed at step 1012. Processing then returns to step 1006.

If the query at step 1008 is answered negatively, processing proceeds to step 1014 where the method 1000 queries whether the user has requested to display performance data for a variable having a particular value (or for when a particular condition holds for a variable). If not, all performance data is displayed at 1016. Otherwise, processing proceeds to step 1018 where the monitor number(s) of interest are determined (i.e., the monitor numbers corresponding to when a variable has the particular value or when the particular condition holds for the variable). The performance data for the monitor number(s) of interest is then retrieved at step 1020 and displayed at step 1022. In one embodiment, the performance data retrieved at step 1020 is the total performance data 356B. In another embodiment, a user may select a breakpoint from which to subset the performance data, in which case the performance data 422 associated with any selected entry of the performance data list 412 is used. Processing then returns to step 1006.

While the foregoing is directed to embodiments of the present invention, other and further embodiments of the invention may be devised without departing from the basic scope thereof, and the scope thereof is determined by the claims that follow.

What is claimed is:

1. A method of categorizing performance data in a debugging environment, comprising:
executing a computer program during a debugging session;
collecting performance data during the debugging session;
categorizing the performance data with debugger information; and
in response to a user query submitted to a debugger and specifying a variable value range for a variable: displaying the categorized performance data collected while the variable is within the variable value range.

2. The method of claim 1, wherein the debugger information is a breakpoint location.

3. A method of categorizing performance data in a debugging environment, comprising:
executing a computer program during a debugging session;
collecting performance data during the debugging session; and
categorizing the performance data with debugger information; wherein categorizing the performance data comprises: associating the performance data with breakpoint information for at least one execution path having an origination point and a terminating point at a breakpoint.

4. The method of claim 3, wherein categorizing occurs upon encountering a debug event.

5. The method of claim 4, wherein the debug event is at least one of a breakpoint and a watchpoint.

6. A method of categorizing performance data in a debugging environment, comprising:
executing a computer program during a debugging session;
collecting performance data during the debugging session; and
categorizing the performance data with debugger information; wherein categorizing the performance data comprises:
at a predefined location in the computer program, determining whether a user-specified condition is satisfied; and
if so, associating breakpoint information with the performance data collected between a program origination point and a program termination point, wherein the program termination point is a stopped point at which the computer program is currently stopped and wherein the program origination point is a stopped point at which the computer program was last stopped prior to the program termination point.

7. The method of claim 6, wherein the predefined location is one of:
a first breakpoint location at the program termination point; and
a second breakpoint location between the program origination point and the program termination point, wherein a user interface is not called upon hitting the second breakpoint location.

8. The method of claim 7, further comprising calling the user interface upon hitting the first breakpoint location.

9. A method of categorizing performance data in a debugging environment, comprising:
executing a computer program during a debugging session;
collecting performance data during the debugging session; and
categorizing the performance data with debugger information; wherein categorizing the performance data comprises:
detecting when a variable changes in value;
incrementing an index value upon detecting that the variable has changed in value; and
storing the index value, a current value of the variable and a name of the variable to an entry of a list; and further comprising, while collecting the performance data, associating the index value with the performance data collected while a variable has the current value.

10. The method of claim 9, wherein detecting comprises determining that a watchpoint fired.

11. The method of claim 9, further comprising, in response to a user query specifying a variable value range for at least one variable in the list:
displaying the categorized performance data collected while the at least one variable was within the variable value range.

12. A computer readable medium containing a debug program which, when executed by a computer configured with a computer program being debugged during a debug session and a performance tool configured to collect performance data during the debugging session, performs operations for categorizing the performance data, the operations comprising:
categorizing the performance data with debugger information, wherein categorizing comprises at least one of three modes, wherein
(a) a first mode comprises: associating the performance data with breakpoint information for at least one execution path of the computer program, the execution path having an execution path origination point and a program termination point at a breakpoint, wherein the program termination point is a stopped point at which the computer program is currently stopped;
(b) a second mode comprises: at a predefined location in the computer program, determining whether a user-specified condition is satisfied; and
if so, associating breakpoint information with the performance data collected between a program origination point and the program termination point, wherein the program origination point is a stopped point at which the computer program was last stopped prior to the program termination point; and
(c) a third mode comprises:
detecting when a variable changes in value;
incrementing an index value upon detecting that the variable has changed in value; and
storing the index value, a current value of the variable and a name of the variable to an entry of a list; and
while collecting the performance data, associating the index value with the performance data collected while a variable has the current value.

13. The computer readable medium of claim 12, wherein the debugger information is a breakpoint location.

14. The computer readable medium of claim 12, wherein detecting comprises determining that a watchpoint fired.

15. The computer readable medium of claim 12, the operations further comprising, when categorizing in the third mode and in response to a use query specifying a variable value range for at least one variable in the list:

displaying performance data collected while the at least one variable was within the variable value range.

16. The computer readable medium of claim 12, wherein categorizing occurs upon encountering a debug event.

17. The computer readable medium of claim 4, wherein the debug event is at least one of a breakpoint and a watchpoint.

18. The computer readable medium of claim 12, wherein the predefined location is one of:

a first breakpoint location at the program termination point; and a second breakpoint location between the computer program on nation point and the program termination point, wherein a user interface is not called upon hitting the second breakpoint location.

19. The computer readable medium of claim 18, further comprising calling the user interface upon hitting the first breakpoint lactation.

20. The computer readable medium of claim 12, further comprising, calling a user interface to display the categorized performance data.

21. The computer readable medium of claim 20, wherein calling the user interface to display the categorized performance data comprises, in response to a user query submitted to the debug program and specifying a variable value range for a variable:

displaying the categorized performance data collected while the variable is within the variable value range.

22. A computer readable medium containing a debug program which, when executed by a computer configured with a computer program being debugged during a debug session and a performance tool configured to collect performance data during the debugging session, performs operations for categorizing the performance data, the operations comprising:

executing the computer program during the debugging session;

collecting performance data during the debugging session;

categorizing the performance data with debugger information; and in response to a user query submitted to the debug program and specifying a variable value range for a variable: calling a user interface to display the performance data collected while the variable is within the variable value range.

23. The computer readable medium of claim 22, further comprising, calling a user interface to display the categorized performance data.

24. The computer readable medium of claim 22, wherein the debugger information is a breakpoint location.

25. The computer readable medium of claim 22, wherein categorizing occurs upon encountering a debug event.

26. The computer readable medium of claim 25, wherein the debug event is at least one of a breakpoint and a watchpoint.

27. The computer readable medium of claim 22, wherein categorizing the performance data comprises: associating the performance data with breakpoint information for at least one execution path of the computer program, the execution path having an origination point and a terminating point at a breakpoint.

28. The computer readable medium of claim 22, wherein categorizing the performance data comprises:

at a predefined location in the computer program, determining whether a user-specified condition is satisfied; and if so, associating breakpoint information with the performance data collected between a program origination point and a program termination point, wherein the program termination point is a stopped point at which the computer program is currently stopped and wherein the program origination point is a stopped point at which the computer program was last stopped prior to the program termination point.

\* \* \* \* \*